(12) United States Patent
Tofte et al.

(10) Patent No.: US 11,635,080 B1
(45) Date of Patent: Apr. 25, 2023

(54) DETERMINING AND UTILIZING A DESIRED FREQUENCY FOR A MECHANICAL SHAKER FOR A SUMP PUMP SYSTEM

(71) Applicant: STATE FARM MUTUAL AUTOMOBILE INSURANCE COMPANY, Bloomington, IL (US)

(72) Inventors: Nathan L. Tofte, Downs, IL (US); Jonathan Christopher Hull, Bloomington, IL (US); John Donovan, Bloomington, IL (US); Richard Jan Tjaden, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/245,689

(22) Filed: Apr. 30, 2021

Related U.S. Application Data (60) Provisional application No. 63/148,885, filed on Feb. 12, 2021, provisional application No. 63/148,880, filed on Feb. 12, 2021, provisional application No. 63/148,894, filed on Feb. 12, 2021, provisional application No. 63/148,926, filed on Feb. 12, 2021, provisional application No. 63/148,923, filed on Feb.
(Continued)

(51) Int. Cl.
*F04D 15/00* (2006.01)
*F04D 13/08* (2006.01)
*F04D 15/02* (2006.01)

(52) U.S. Cl.
CPC ....... *F04D 15/0272* (2013.01); *F04D 13/086* (2013.01); *F04D 15/0088* (2013.01); *F04D 15/0218* (2013.01)

(58) Field of Classification Search
CPC .... F04D 13/08; F04D 13/086; F04D 15/0088; F04D 15/0218; F04C 14/28
See application file for complete search history.

(56) References Cited

U.S. PATENT DOCUMENTS

| 4,624,280 A | 11/1986 | DePirro |
| 5,591,010 A | 1/1997 | van Zyl |
(Continued)

FOREIGN PATENT DOCUMENTS

| CN | 111626536 A | 9/2020 |
| CN | 113138558 A | 7/2021 |
(Continued)

OTHER PUBLICATIONS

Adafruit, "Assembled Adafruit HUZZAH32—ESP32 Feather Board—with Stacking Headers," Retrieved from the Internet at: <https://www.adafruit.com/product/3619> on Apr. 26, 2021.
(Continued)

*Primary Examiner* — David E Sosnowski
*Assistant Examiner* — Jason G Davis
(74) *Attorney, Agent, or Firm* — Marshall, Gerstein & Borun LLP (57) ABSTRACT

A sump pump system enables automatic determination and utilization of frequencies for mechanical shakers for sump pumps. These techniques may be implemented to detect a fault (e.g., a stuck impeller) with a sump pump and to identify a desirable frequency at which a mechanical shaker for the sump pump should vibrate to correct the fault.

20 Claims, 4 Drawing Sheets

Related U.S. Application Data

12, 2021, provisional application No. 63/148,783, filed on Feb. 12, 2021, provisional application No. 63/148,909, filed on Feb. 12, 2021.

(56) References Cited

U.S. PATENT DOCUMENTS

| | | |
|---|---|---|
| 5,672,050 A | 9/1997 | Webber et al. |
| 6,330,525 B1 * | 12/2001 | Hays .................. F04D 15/0088 |
| | | 702/182 |
| 7,309,216 B1 | 12/2007 | Spadola, Jr. et al. |
| 8,380,355 B2 | 2/2013 | Mayleben et al. |
| 8,490,006 B1 | 7/2013 | Reeser et al. |
| 8,527,306 B1 | 9/2013 | Reeser et al. |
| 8,533,144 B1 | 9/2013 | Reeser et al. |
| 8,640,038 B1 | 1/2014 | Reeser et al. |
| 8,665,084 B2 | 3/2014 | Shapiro et al. |
| 8,890,680 B2 | 11/2014 | Reeser et al. |
| 8,892,263 B1 | 11/2014 | Morris et al. |
| 8,917,186 B1 | 12/2014 | Grant |
| 8,976,937 B2 | 3/2015 | Shapiro et al. |
| 9,049,168 B2 | 6/2015 | Jacob et al. |
| 9,057,746 B1 | 6/2015 | Houlette et al. |
| 9,117,349 B2 | 8/2015 | Shapiro et al. |
| 9,142,119 B1 | 9/2015 | Grant |
| 9,152,737 B1 | 10/2015 | Micali et al. |
| 9,183,578 B1 | 11/2015 | Reeser et al. |
| 9,202,363 B1 | 12/2015 | Grant |
| 9,262,909 B1 | 2/2016 | Grant |
| 9,274,530 B1 * | 3/2016 | Morris ................ F04D 15/0218 |
| 9,286,772 B2 | 3/2016 | Shapiro et al. |
| 9,344,330 B2 | 5/2016 | Jacob et al. |
| 9,424,737 B2 | 8/2016 | Bailey et al. |
| 9,443,195 B2 | 9/2016 | Micali et al. |
| 9,472,092 B1 | 10/2016 | Grant |
| 9,589,441 B2 | 3/2017 | Shapiro et al. |
| 9,609,003 B1 | 3/2017 | Chmielewski et al. |
| 9,665,892 B1 | 5/2017 | Reeser et al. |
| 9,666,060 B2 | 5/2017 | Reeser et al. |
| 9,699,529 B1 | 7/2017 | Petri et al. |
| 9,739,813 B2 | 8/2017 | Houlette et al. |
| 9,786,158 B2 | 10/2017 | Beaver et al. |
| 9,798,979 B2 | 10/2017 | Fadell et al. |
| 9,798,993 B2 | 10/2017 | Payne et al. |
| 9,800,570 B1 | 10/2017 | Bleisch |
| 9,800,958 B1 | 10/2017 | Petri et al. |
| 9,812,001 B1 | 11/2017 | Grant |
| 9,888,371 B1 | 2/2018 | Jacob |
| 9,892,463 B1 | 2/2018 | Hakimi-Boushehri et al. |
| 9,898,168 B2 | 2/2018 | Shapiro et al. |
| 9,898,912 B1 | 2/2018 | Jordan, II et al. |
| 9,911,042 B1 | 3/2018 | Cardona et al. |
| 9,923,971 B2 | 3/2018 | Madey et al. |
| 9,942,630 B1 | 4/2018 | Petri et al. |
| 9,947,202 B1 | 4/2018 | Moon et al. |
| 9,978,033 B1 | 5/2018 | Payne et al. |
| 9,997,056 B2 | 6/2018 | Bleisch |
| 10,002,295 B1 | 6/2018 | Cardona et al. |
| 10,042,341 B1 | 8/2018 | Jacob |
| 10,047,974 B1 | 8/2018 | Riblet et al. |
| 10,055,793 B1 | 8/2018 | Call et al. |
| 10,055,803 B2 | 8/2018 | Orduna et al. |
| 10,057,664 B1 | 8/2018 | Moon et al. |
| 10,073,929 B2 | 9/2018 | Vaynriber et al. |
| 10,102,584 B1 | 10/2018 | Devereaux et al. |
| 10,102,585 B1 | 10/2018 | Bryant et al. |
| 10,107,708 B1 | 10/2018 | Schick et al. |
| 10,112,222 B1 * | 10/2018 | Davis .................... F04B 23/021 |
| 10,142,394 B2 | 11/2018 | Chmielewski et al. |
| 10,176,705 B1 | 1/2019 | Grant |
| 10,181,160 B1 | 1/2019 | Hakimi-Boushehri et al. |
| 10,186,134 B1 | 1/2019 | Moon et al. |
| 10,198,771 B1 | 2/2019 | Madigan et al. |
| 10,217,068 B1 | 2/2019 | Davis et al. |
| 10,229,394 B1 | 3/2019 | Davis et al. |
| 10,244,294 B1 | 3/2019 | Moon et al. |
| 10,249,158 B1 | 4/2019 | Jordan, II et al. |
| 10,282,787 B1 | 5/2019 | Hakimi-Boushehri et al. |
| 10,282,788 B1 | 5/2019 | Jordan, II et al. |
| 10,282,961 B1 | 5/2019 | Jordan, II et al. |
| 10,295,431 B1 | 5/2019 | Schick et al. |
| 10,296,978 B1 | 5/2019 | Corder et al. |
| 10,297,138 B2 | 5/2019 | Reeser et al. |
| 10,304,313 B1 | 5/2019 | Moon et al. |
| 10,323,860 B1 | 6/2019 | Riblet et al. |
| 10,325,473 B1 | 6/2019 | Moon et al. |
| 10,332,059 B2 | 6/2019 | Matsuoka et al. |
| 10,346,811 B1 | 7/2019 | Jordan, II et al. |
| 10,353,359 B1 | 7/2019 | Jordan, II et al. |
| 10,356,303 B1 | 7/2019 | Jordan, II et al. |
| 10,387,966 B1 | 8/2019 | Shah et al. |
| 10,388,135 B1 | 8/2019 | Jordan, II et al. |
| 10,412,169 B1 | 9/2019 | Madey et al. |
| 10,446,000 B2 | 10/2019 | Friar et al. |
| 10,467,476 B1 | 11/2019 | Cardona et al. |
| 10,469,282 B1 | 11/2019 | Konrardy et al. |
| 10,480,825 B1 | 11/2019 | Riblet et al. |
| 10,482,746 B1 | 11/2019 | Moon et al. |
| 10,506,411 B1 | 12/2019 | Jacob |
| 10,514,669 B1 | 12/2019 | Call et al. |
| 10,515,372 B1 | 12/2019 | Jordan, II et al. |
| 10,522,009 B1 | 12/2019 | Jordan, II et al. |
| 10,546,478 B1 | 1/2020 | Moon et al. |
| 10,547,918 B1 | 1/2020 | Moon et al. |
| 10,565,541 B2 | 2/2020 | Payne et al. |
| 10,573,146 B1 | 2/2020 | Jordan, II et al. |
| 10,573,149 B1 | 2/2020 | Jordan, II et al. |
| 10,579,028 B1 | 3/2020 | Jacob |
| 10,586,177 B1 | 3/2020 | Choueiter et al. |
| 10,607,295 B1 | 3/2020 | Hakimi-Boushehri et al. |
| 10,634,576 B1 | 4/2020 | Schick et al. |
| 10,664,922 B1 | 5/2020 | Madigan et al. |
| 10,679,292 B1 | 6/2020 | Call et al. |
| 10,685,402 B1 | 6/2020 | Bryant et al. |
| 10,699,346 B1 | 6/2020 | Corder et al. |
| 10,699,348 B1 | 6/2020 | Devereaux et al. |
| 10,726,494 B1 | 7/2020 | Shah et al. |
| 10,726,500 B1 | 7/2020 | Shah et al. |
| 10,733,671 B1 | 8/2020 | Hakimi-Boushehri et al. |
| 10,733,868 B2 | 8/2020 | Moon et al. |
| 10,735,829 B2 | 8/2020 | Petri et al. |
| 10,740,691 B2 | 8/2020 | Choueiter et al. |
| 10,741,033 B1 | 8/2020 | Jordan et al. |
| 10,750,252 B2 | 8/2020 | Petri et al. |
| 10,795,329 B1 | 10/2020 | Jordan, II et al. |
| 10,796,557 B2 | 10/2020 | Sundermeyer et al. |
| 10,802,477 B1 | 10/2020 | Konrardy et al. |
| 10,804,700 B2 | 10/2020 | Cohen et al. |
| 10,818,105 B1 | 10/2020 | Konrardy et al. |
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,846,800 B1 | 11/2020 | Bryant et al. |
| 10,907,844 B2 | 2/2021 | Ribbich et al. |
| 10,922,756 B1 | 2/2021 | Call et al. |
| 10,922,948 B1 | 2/2021 | Moon et al. |
| 10,943,447 B1 | 3/2021 | Jordan, II et al. |
| 10,970,990 B1 | 4/2021 | Jacob |
| 10,990,069 B1 | 4/2021 | Jacob |
| 11,003,334 B1 | 5/2021 | Conway et al. |
| 11,004,320 B1 | 5/2021 | Jordan, II et al. |
| 11,015,997 B1 | 5/2021 | Schick et al. |
| 11,017,480 B2 | 5/2021 | Shah et al. |
| 11,042,137 B1 | 6/2021 | Call et al. |
| 11,042,942 B1 | 6/2021 | Hakimi-Boushehri et al. |
| 11,043,098 B1 | 6/2021 | Jordan, II et al. |
| 11,049,078 B1 | 6/2021 | Jordan, II et al. |
| 11,049,189 B2 | 6/2021 | Shah et al. |
| 11,074,659 B1 | 7/2021 | Hakimi-Boushehri et al. |
| 11,100,594 B1 | 8/2021 | West et al. |
| 11,118,812 B1 | 9/2021 | Riblet et al. |
| 11,126,708 B2 | 9/2021 | Reimer |
| 11,164,257 B1 | 11/2021 | Devereaux et al. |

(56) References Cited

U.S. PATENT DOCUMENTS

| | | |
|---|---|---|
| 11,232,873 B1 | 1/2022 | Aspro et al. |
| 11,277,465 B2 | 3/2022 | Chmielewski et al. |
| 11,348,193 B1 | 5/2022 | Konrardy et al. |
| 11,417,212 B1 | 8/2022 | Farooqui et al. |
| 2003/0049134 A1 | 3/2003 | Leighton et al. |
| 2004/0064012 A1 | 4/2004 | Yanai |
| 2004/0090197 A1 | 5/2004 | Schuchmann |
| 2004/0221647 A1 | 11/2004 | Sabatino |
| 2009/0074338 A1 | 3/2009 | Hagshenas et al. |
| 2009/0123295 A1 | 5/2009 | Abbott |
| 2009/0265193 A1 | 10/2009 | Collins et al. |
| 2011/0110794 A1 | 5/2011 | Mayleben et al. |
| 2012/0260729 A1 | 10/2012 | Bayley et al. |
| 2013/0197700 A1 | 8/2013 | Kochan et al. |
| 2014/0266669 A1 | 9/2014 | Fadell et al. |
| 2015/0061859 A1 | 3/2015 | Matsuoka et al. |
| 2015/0347910 A1 | 12/2015 | Fadell et al. |
| 2016/0333884 A1 | 11/2016 | Hussain et al. |
| 2017/0075363 A1 | 3/2017 | Steinke |
| 2017/0100632 A1 | 4/2017 | Castelo Branco et al. |
| 2017/0335550 A1 | 11/2017 | Sterling et al. |
| 2017/0342812 A1 | 11/2017 | Kuhn |
| 2018/0247513 A1 | 8/2018 | Calvert et al. |
| 2018/0363639 A1 | 12/2018 | Cathell et al. |
| 2018/0375680 A1 | 12/2018 | Wright et al. |
| 2019/0101427 A1 | 4/2019 | Beger et al. |
| 2019/0251520 A1 | 8/2019 | Bentley, III et al. |
| 2019/0353156 A1 | 11/2019 | Ward et al. |
| 2020/0003217 A1 | 1/2020 | Wilds |
| 2020/0302549 A1 | 9/2020 | Jordan, II et al. |
| 2020/0327791 A1 | 10/2020 | Moon et al. |
| 2021/0035432 A1 | 2/2021 | Moon et al. |
| 2021/0042843 A1 | 2/2021 | Bryant et al. |
| 2021/0158671 A1 | 5/2021 | Jordan, II et al. |
| 2021/0279811 A1 | 9/2021 | Waltman et al. |
| 2021/0312789 A1 | 10/2021 | Linn |
| 2022/0101275 A1 | 3/2022 | Aspro et al. |

FOREIGN PATENT DOCUMENTS

| | | |
|---|---|---|
| JP | 2003157357 A | 5/2003 |
| KR | 20150129845 A | 11/2015 |
| WO | WO-2014159131 A2 | 10/2014 |
| WO | WO-2016081511 A2 | 5/2016 |
| WO | WO-2017/173463 A1 | 10/2017 |
| WO | WO-2021087185 A1 | 5/2021 |

OTHER PUBLICATIONS

APG, Automation Products Group, Inc., "5 Tips on Using an Ultrasonic Level Sensor in a Lift Station," Retrieved from the Internet at: <http://romtecutilities.com/pressure-transducers-for-pump-lift-stations/> on Apr. 26, 2021.

FLOWLINE™, "Municipal Sewer Pump Station Radar Level Sensor," Retrieved from the Internet at: <https://www.flowline.com/municipal-sewer-lift-station-radar-level-transmitter/> on Apr. 26, 2021.

Levelguard, Fluid Control Products, "Reliable Liquid Level Sensing Solutions," Retrieved from the Internet at: <https://www.levelguardproducts.com/> on Apr. 26, 2021.

Romtec Utilities, "Pressure Transducers for Pump & Lift Stations," Retrieved from the Internet at: <https://www.flowline.com/municipal-sewer-lift-station-radar-level-transmitter/> on Apr. 26, 2021.

The Basement Watchdog, "Connected Pumps," Retrieved from the Internet at: <https://www.adafruit.com/product/3619> on Apr. 26, 2021.

The Home Depot, "1/2 HP Submersible 12-Volt DC WiFi Connected Battery Backup Sump Pump and Monitoring System," Retrieved from the Internet at: <https://www.homedepot.com/p/PumpSpy-1-2-HP-Submersible-12-Volt-DC-WiFi-Connected-Battery-Backup-Sump-Pump-and-Monitoring-System-PS2000/310520482> on Apr. 26, 2021.

* cited by examiner

DETERMINING AND UTILIZING A DESIRED FREQUENCY FOR A MECHANICAL SHAKER FOR A SUMP PUMP SYSTEM

CROSS-REFERENCE TO RELATED APPLICATIONS

This application claims priority to (i) U.S. Provisional Application Ser. No. 63/148,783, filed Feb. 12, 2021, entitled "DETECTING AND UTILIZING A RISE RATE FOR SUMP PUMP SYSTEM CONTROL," (ii) U.S. Provisional Application Ser. No. 63/148,880, filed Feb. 12, 2021, entitled "DETECTING AND UTILIZING WATER VIBRATIONS IN SUMP PUMP SYSTEM CONTROL," (iii) U.S. Provisional Application Ser. No. 63/148,885, filed Feb. 12, 2021, entitled "DETECTING AND UTILIZING VIBRATION PATTERNS OF SUMP PUMPS," (iv) U.S. Provisional Application Ser. No. 63/148,894, filed Feb. 12, 2021, entitled "ADAPTIVE LEARNING SYSTEM FOR IMPROVING SUMP PUMP CONTROL," (v) U.S. Provisional Application Ser. No. 63/148,909, filed Feb. 12, 2021, entitled "DETERMINING AND UTILIZING A DESIRED FREQUENCY FOR A MECHANICAL SHAKER FOR A SUMP PUMP SYSTEM," (vi) U.S. Provisional Application Ser. No. 63/148,923, filed Feb. 12, 2021, entitled "SYSTEMS AND METHODS FOR MANIPULATING CONTROL OF SUMP PUMPS TO EXTEND LIFESPANS OF SUMP PUMPS," and (vii) U.S. Provisional Application Ser. No. 63/148,926, filed Feb. 12, 2021, entitled "SUMP PUMP SMART HOME INTEGRATION," the entire disclosures of which are expressly incorporated herein by reference.

TECHNICAL FIELD

The present disclosure generally relates to a sump pump system, and, more specifically, to techniques for determining and utilizing a desired frequency for a mechanical shaker for the sump pump.

BACKGROUND

A sump pump is a type of pump used to remove water that has accumulated in a lower level (e.g., a basement, a ground floor level, a sub-ground floor level, etc.) of a property (e.g., a home, an office, or any other building or structure). The sump pump sends the water into pipes that lead away from the property so that potential lower-level flooding may be avoided. As such, failures in the sump pump can have disastrous consequences including water damages and insurance losses. However, sump pump failures often occur without prior warning or may not be discovered until significant damage has already been done. Unfortunately, many currently available sump pump systems are not designed or equipped to automatically detect impending sump pump failures, or remedy such failures even if they are detected.

SUMMARY

The described methods and systems enable automatic determination and utilization of frequencies for mechanical shakers for sump pumps. These techniques may be implemented to detect a fault (e.g., a stuck impeller) with a sump pump and to identify a desirable frequency at which the mechanical shaker should vibrate to correct the fault.

In an embodiment, a sump pump system may be configured to automatically determine and utilize frequencies for mechanical shakers. The sump pump system may include a sump pump disposed in a sump basin and configured to pump water out of the sump basin via an outlet pipe. The sump pump system may include a sensor configured to detect motion or acceleration (e.g., a force sensor or accelerometer). The sump pump system may include a mechanical shaker attached to the sump pump and configured to shake the sump pump in order to produce vibrations in the sump pump. The sump pump system may include a sump pump control system coupled to the sump pump, the sensor, and the mechanical shaker. The sump pump control system may be configured to: detect a fault with the sump pump; respond to detecting the fault by activating the mechanical shaker at a first frequency to shake the sump pump in order to produce vibrations in the sump pump in an attempt to correct the fault; ramp the frequency up at a predetermined rate; while the sump pump control system is ramping the frequency: (i) collect acceleration data representing acceleration detected via the sensor, and/or (ii) detect, based on an analysis of the collected acceleration data, a desired acceleration pattern corresponding to a correction of the fault; and/or respond to detecting the desired acceleration pattern by deactivating the mechanical shaker.

In an embodiment, a method for automatically determining and utilizing frequencies for mechanical shakers is implemented. The method may comprise any one or more of: detecting, via a sump pump control system, a fault with a sump pump; responding, via the sump pump control system, to detecting the fault by activating the mechanical shaker at a first frequency to shake the sump pump in order to produce vibrations in the sump pump in an attempt to correct the fault; ramping the frequency higher at a predetermined rate; while the sump pump control system is ramping the frequency: (i) collecting acceleration data representing acceleration detected via the sensor, and/or (ii) detecting, based on an analysis of the collected acceleration data, a desired acceleration pattern corresponding to a correction of the fault; and/or responding, via the sump pump control system, to detecting the desired acceleration pattern by deactivating the mechanical shaker.

In an embodiment, a method for automatically determining and utilizing frequencies for mechanical shakers is implemented. The method may comprise any one or more of: detecting, via a sump pump control system, a fault with a sump pump; responding, via the sump pump control system, to detecting the fault by: (i) detecting, via a sensor configured to detect acceleration, a current acceleration pattern; (ii) analyzing a set of known relationships between known acceleration patterns, known faults, and suggested frequencies to identify a known acceleration pattern mostly closely corresponding to the current acceleration pattern; (iii) detecting, within the set of known relationships, a suggested frequency corresponding to the known acceleration pattern; and/or (iv) activating a mechanical shaker that is physically attached to the sump pump and that is configured to shake according to a frequency variable, to shake at the suggested frequency, to thereby shake the sump pump in order to produce vibrations in the sump pump in an attempt to correct the fault.

Note, this summary has been provided to introduce a selection of concepts further described below in the detailed description. As explained in the detailed description, certain embodiments may include features and advantages not described in this summary, and certain embodiment may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

DETAILED DESCRIPTION

The disclosed techniques enable automatic determination and utilization of frequencies for mechanical shakers for sump pumps. These techniques may be implemented to detect a fault (e.g., a stuck impeller) with a sump pump and to identify a desirable frequency at which the mechanical shaker should vibrate to correct the fault (e.g., to break loose debris blocking a pipe or locking up an impeller).

Generally speaking, sump pumps are used in areas where lower level (e.g., ground level or below ground level) flooding may be a problem and/or is a recurring problem. A typical sump pump system comprises a submersible impeller type pump disposed in a sump basin. The sump basin is a holding cavity formed by digging a recess into the floor of a lower level of a property, such as a ground level or below ground level (e.g., a basement) of a property (e.g., a home, an office, or any other building or structure). The sump basin acts both to house the sump pump and to collect accumulated water. Water may accumulate in the sump basin when excessive amounts of rain, snow melt or ground water saturate the soil adjacent to the property and/or property lower level floor. Water may also enter the sump basin via drainage or inlet pipes that have been placed into the ground to divert any excess water into the sump basin before the water can begin to permeate foundation walls, floors, etc., or water may enter the sump basin through porous or cracked walls, floors, etc. Generally speaking, the sump basin is installed in a basement such that the top of the sump basin is lower than the lowest floor level in the basement. Accordingly, when the water table underneath and around the property rises, water flows into the sump basin to then be pumped away from the area, thereby avoiding the water table rising above the basement floor (which can result in leaks and flooding due to the typically porous nature of basement walls). In any event, after the sump pump basin fills and the water reaches a high-water mark, the sump pumping action of a sump pump removes the accumulated water in the sump basin via one or more outlet or discharge pipes that carries the pumped water to an area away from the property (such as into a municipal storm drain, a dry well, a water retention area, etc.), thereby avoiding potential flooding inside the building. Ideally, the sump basin fills and empties at a rate fast enough to prevent the water table from rising above the basement floor.

Figure 1:
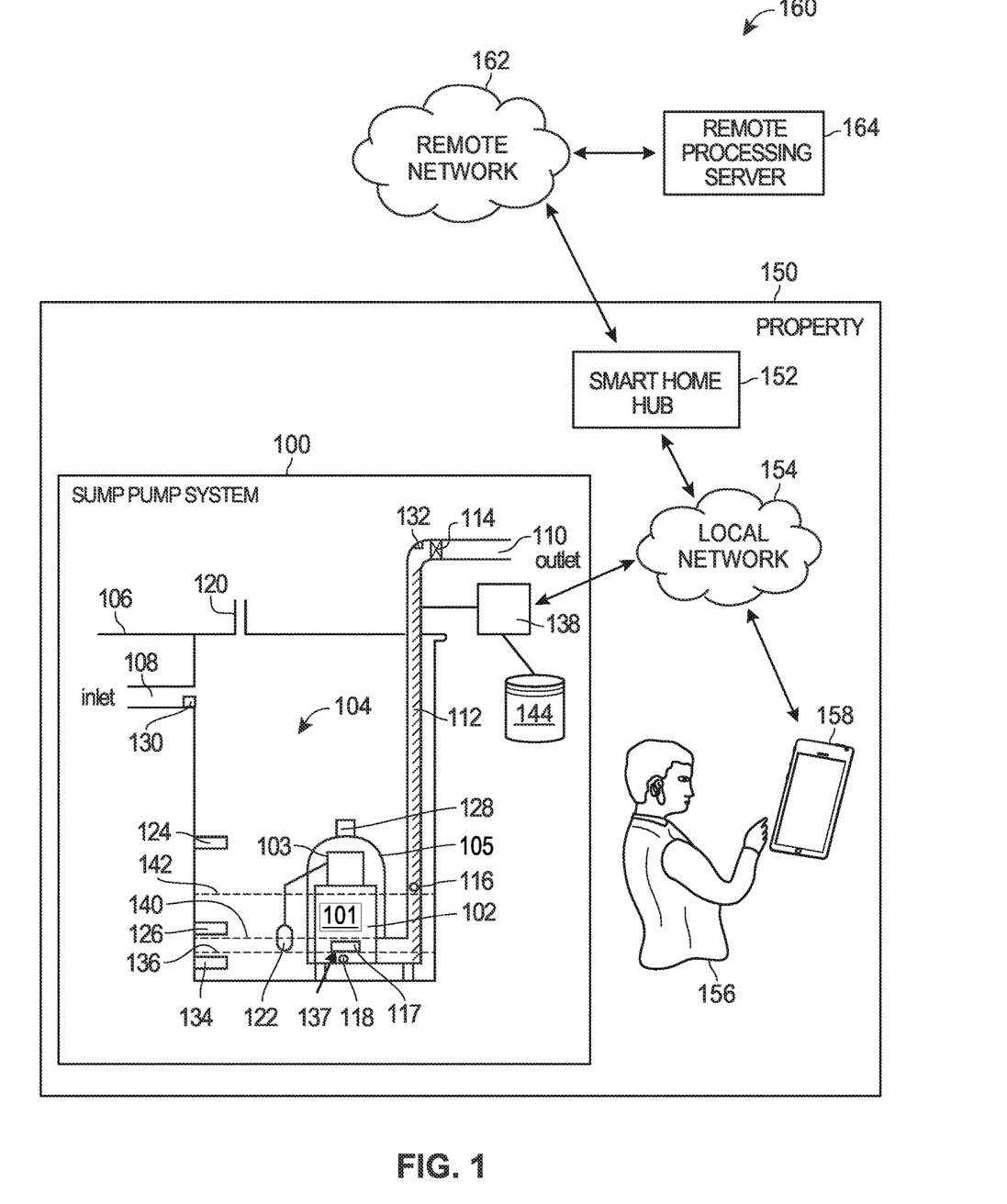
FIG. 1 illustrates an example sump pump system constructed in accordance with disclosed embodiments, and shown in an example sump pump network system.

Turning to the figures, FIG. 1 illustrates an example sump pump system 100 that can be used to remove water accumulated in a lower level of a property 150 (e.g., a home, an office, or any other building or structure). As shown in FIG. 1, the sump pump system 100 may be part of an example sump pump network system 160.

The example sump pump system 100 includes a sump pump 102 located in a sump basin 104. The sump pump 102 and a sump pump motor 103 are enclosed in a housing 105. The sump pump motor 103 may also be referred to herein as the motor 103, and the sump pump 102 may also be referred to herein as the pump 102. While the sump pump 102 in FIG. 1 is shown as a submersible type sump pump (e.g., where the motor 103 and the sump pump 102 are mounted inside the basin 104), the sump pump 102, in general, may be any type of sump pump, such as a pedestal type sump pump that is mounted above or outside of the basin 104. As shown in FIG. 1, the sump basin 104 is a well-like cavity or hole formed through a floor 106 of the property 150. The example sump pump system 100 also includes a water inlet pipe 108 terminating at the sump basin 104, and a discharge pipe 112 (also referred to herein as an outlet pipe) connected to the sump pump 102 to carry water out of the sump basin 104. An impeller 117 of the sump pump 102 draws in water through an inlet 118, and pumps the water up the discharge pipe 112 to an outlet 110. In the illustrated example, the discharge pipe 112 extends upward from the sump pump 102 and then out of the building. However, other arrangements may be used. The discharge pipe 112 is outfitted with a check valve 114. The check valve 114 allows water to flow up through the discharge pipe 112, but does not allow the water in the discharge pipe 112 to flow back into the sump basin 104 when the sump pump 102 is off. A weep hole 116 in the discharge pipe 112 allows excess air to escape from the pipe, preventing air binding, also known as air locking. The opening of the sump basin 104 may be protected by a cover to prevent objects from falling into the basin, and to keep noxious gases (e.g., radon) from entering the property 150. In the case of a sealed sump pump basin 104, an air vent 120 may be needed to relieve excess air pressure in the basin.

Generally, the sump pump 102 may be electrically powered and hardwired into the electrical system of the property 150. Additionally and/or alternatively, the sump pump 102 may be powered by a battery or other independent power source (not shown for clarity of illustration). The operation of the sump pump 102 is controlled by a pump activation switch 122 in response to a water level in the basin 104. For example, the sump activation switch 122 may activate the sump pump 102 when a water level in the sump basin 104 reaches a preset level. The preset level is determined by the placement of the sump pump activation switch 122. In illustrated example of FIG. 1, the sump pump activation switch 122 is shown in the form of a float switch, although other technologies such as liquid level sensors may also be used.

As shown in FIG. 1, the sump pump activation switch 122 is connected to the motor 103 of the sump pump 102. In some embodiments, the sump pump activation switch 122 is a level sensor, such as a float switch. When the rising water in the basin 104 lifts a float of the sump pump activation switch 122 to a high water level or mark 142, the float rises a rod, which activates and/or energizes the motor 103 to begin pumping water. In other embodiments, the sump pump activation switch 122 may be a mercury tilt switch. The rising water in the basin 104 lifts and tilts a float of the sump pump activation switch 122 and, when the float reaches the high water level or mark 142, a sufficient tilt causes a small amount of liquid mercury to slide towards open electrodes to close an electrical circuit, which activates and/or energizes the motor 103. As water is pumped out of the sump basin 104, the water level drops to a low or initial water level or mark 140. The falling water level carries the sump pump activation switch 122 back to an initial or low water level or mark 140, at which the sump pump activation switch 122 is deactivated. Thus, the motor 103 de-energizes or shuts off at the initial or low water level or mark 140.

When the sump pump 102 and/or the motor 103 fails, flooding may ensue as water fills up the sump basin 104 and overflows above the floor level 106 of the property 150. The amount of water that overflows can vary from a few inches to several feet, which may result in substantial water damage to the structures of property 150, as well as personal belongings. Accordingly, the ability to maintain sump pumps, and to detect and resolve impending sump pump failures before they occur is of great importance to the property owners and the building and property insuring parties.

The sump pump 102 may fail because of a failure in the motor 103, which renders the entire sump pump 102 inoperable. The failure in the motor 103 may be caused by various factors such as age, fatigue, overheating, poor maintenance, etc. Aside from the failure of the motor 103, the sump pump 102 may fail because of other soft mechanical failures of the components of the sump pump system 100. For example, sediment or debris build-up may cause the motor impeller 117 and/or another sump pump component to stall, thus, rendering the sump pump 102 unable to pump water even though the motor 103 is operational. Additionally or alternatively, the sump pump activation switch 122 may fail to engage in response to the rising water level and subsequently fail to actuate the motor 103. Additionally or alternatively, the check valve 114 may malfunction, and back flow of the discharged water into the sump pump basin 104 may equal or exceed the amount of water being pumped out by the sump pump 102. Additionally or alternatively, there might be a blockage in the discharge pipe 112, preventing water flow to the outlet 110. Additionally and/or alternatively, an air pocket may cause the sump pump 102 to run dry. As such, mechanisms to maintain the sump pump and/or detect impending sump pump failures may include monitoring for the occurrence of such failures.

Generally, soft mechanical failures may be identified or detected indirectly. In an embodiment, soft mechanical failures may be detected by using properly placed sensors, such as sensors 124, 126, 128, 130, 132, and 134 of FIG. 1, able to detect issues associated with failures of the sump pump system 100. The sensors 124, 126, 128, 130, 132, and 134 may be configured to communicate with a sump pump controller 138, which may be configured to communicate with other components of the sump pump system 100, or components of a sump pump network system 160, described below. The sump pump controller 138 may also be referred to in this specification as the controller 138. The controller 138 is configured to receive and analyze data from the sensors 124, 126, 128, 130, 132, and 134 using built-in computing capabilities or in cooperation with other computing devices of the sump pump network system 160 to identify specific failures of the sump pump system 100, and in some instances remediate the issues, and/or generate an alert regarding the detected failures. Interactions between the sensors 124, 126, 128, 130, 132, and 134, the controller 138, and the components of the system 160 are discussed below in more detail.

Example remedies to soft mechanical failures (such as a blockage or stuck impeller) may include activating a shaker, altering a speed of a pump impeller, reversing a direction of spin of the pump impeller, gradually accelerating the impeller, or alternating gradual accelerations of the impeller with gradual decelerations. If desired, the sump pump system 100 may include a variable speed motor or controller for the sump pump 102. In an embodiment, the sump pump motor 103 is a variable speed motor; in an embodiment, it is not. Similarly, in an embodiment, the sump pump controller 138 is a variable speed controller; in an embodiment, it is not.

For example, in embodiments in which the pump impeller is reversed or adjusted in speed, a variable speed motor or controller may be included for controlling the pump and/or pump impeller in such a manner. In some embodiments, a variable speed motor or controller may detect a blocked impeller by sensing that the position of the rotor or impeller is not changing even though power is applied. To dislodge the mechanical blockage, the controller may spin the motor in reverse direction or alternate gradual acceleration with gradual deceleration in opposite directions. Gradual acceleration upon motor activation and gradual deceleration upon motor disengagement may reduce initial step level force impact of the pump turning on or off, which may benefit the system by lengthening the serviceable life of the motor and the marginal pipe infrastructure.

As shown in FIG. 1, the sump pump system 100 may include a variety of mechanical, electrical, optical, or any other suitable sensors 124, 126, 128, 130, 132, and 134 disposed within, at, throughout, embedded within, or in mechanical connection to the sump basin 104, the sump pump housing 105, the inlet pipe 108, or the discharge pipe 112. Additionally, the sensors 124, 126, 128, 130, 132, and 134 may be disposed on, at, or within the motor 103, the sump pump 102, or any other components of the sump pump system 100. The one or more sensors 124, 126, 128, 130, 132, and 134 may transduce one or more of: light, sound, acceleration, translational or rotational movement, strain, pressure, presence of liquid, or other suitable signals into electrical signals. The sensors 124, 126, 128, 130, 132, and 134 may be acoustic, photonic, micro-electro-mechanical systems (MEMS) sensors, or any other suitable type of sensor.

The sensor 124 may be a water level sensor, placed a short distance (e.g., 10, 20, 30, or 50 mm above) above the high water level or mark 142 in the sump basin 104. In operation, if the water level sensor 124 does not detect water, then the water level in the basin 104 is deemed adequate. In other words, the sump pump 102 is either working properly to constantly pump water out of the basin 104, or the water level is not yet high enough to activate the sump pump 102. In any event, it can be assumed that the sump pump 102 is not experiencing any soft mechanical failure. On the other hand, if the water level sensor 124 detects water, then water may be on the rise in the basin 104, and may overflow the sump basin 104. In other words, a dangerous level of water is present in the sump basin 104, which may be due to either a failure of the sump pump 102, a failure to activate the sump pump 102, and/or a soft mechanical failure that has rendered the sump pump 102 unable to pump out adequate amount of water.

The sensor 124 may include magnetic or mechanical floats, pressure sensors, optical, ultrasonic, radar, capacitance, electroconductive and/or electrostatic sensors. The sensor 124 may be a continuous or a point level switch. A continuous liquid level switch or sensor provides a continuous feedback showing liquid level within a specified range.

A point level switch detects whether a liquid level is above or below a certain sensing point. In embodiments, the sensor 124 may be a reed switch, or a mercury switch, a conductive level sensor, and/or any type of a suitable switch that changes a state from inactive to active as liquid level reaches a certain level relative to the switch position.

In some embodiments, the sensor 124 may be a continuous liquid level switch providing a measurement of the height of the water level inside the sump basin 104. The controller 138 can use these measurements, taken at time intervals (e.g., at 1, 5, or 10 second intervals), to estimate the volume of water being pumped, deposited, or backflowing in the sump basin 104. For example, knowing the sump pump basin 104 dimensions, such as a diameter (if the basin is a cylinder), or the bottom diameter, a top diameter, and a height (if the basin is a graduated cylinder) or width and length measurements (if the basin is a rectangular prism), and water level height over time will yield a measurement of water volume increase or decrease over time. The controller 138 may utilize any suitable volume formula to calculate changes in volume (e.g., volume=$\pi r^2 h$ for a cylinder). For example, if the basin 104 is a cylinder basin, the controller 138 may be programmed to assume a known radius (e.g., 8 inches). The controller 138 may identify the distance from the bottom of the basin 104 to the water level (e.g., based on a water level sensor). This distance may be used for the "h" variable in the volume formula, enabling the controller 138 to calculate volume at any given time it can detect the "height" of the water level. In some instances, the controller 138 may be configured to account for displacement that occurs due to the pump itself being submerged within water. For example, a known volume of the pump (which is generally static) may be subtracted from a formula that assumes a perfect cylinder.

Additionally, knowing the sump basin 104 capacity (e.g., in gallons) and water volume increase over time, the controller 138 may calculate an estimate of when the sump pump basin may overflow. For example, in a sump basin with a capacity of 26 gallons and an initial water volume of 0 gallons, the controller 128 may calculate that a water volume increase at 0.1 gallons per second would result in a sump basin overflow in 260 seconds or 4 minutes and 20 seconds. The sump pump controller 138 may generate an alert, communicating an approximated time of the critical event of the sump basin 104 overflowing, or communicating the time (e.g., in minutes or seconds) remaining until the estimated overflow.

Additionally, functions of the sump pump controller 138 of FIG. 1 may be used together with the water level sensor 124 to detect certain soft mechanical failures, such as when the sump motor 103 becomes stuck and runs indefinitely. This may be due to a mechanical malfunction of the sump pump activation switch 122 or another activation element. In this scenario, when the water level sensor 124 does not detect water, the sump pump controller 138 may analyze the electrical load waveform of the motor 103 to determine how long the motor 103 is running. In general, if the sump pump 102 is working properly, then the motor 103 will automatically shut off when the falling water carries the sump pump activation switch 122 back to the initial or low level or mark 140. However, if the sump pump activation switch 122 jams or otherwise fails, then the sump motor 103 may become stuck and continue to run for a long time. Thus, if the water level sensor 124 is not detecting water but the sump pump controller 138 is detecting a long period of run time on the part of the sump motor 103 (e.g., if the run time of the sump motor 103 exceeds a certain length of time), then the sump pump 102 may be deemed to be experiencing a soft mechanical failure.

The sensor 126 may be a force sensor or transducer, configured to detect a water rise or fall rate in the sump basin 104, or water disturbance (e.g., splashing) in the sump basin 104. The sensor 126 may be, for example a piezoelectric crystal, a pneumatic, a hydraulic, an inductive, a capacitive, a magnetostrictive, or a strain gage load cell, or an accelerometer, or any other suitable sensor capable of transducing a force into an electrical signal. In an embodiment, an accelerometer of the sensor 126 measures inertial acceleration, from which water rise rate in the sump basin 104 can be determined.

The sensor 126 may be placed above the initial or low water level or mark 140 and, for example, below the high water level or mark 142 in the sump basin 104. Alternatively, the sensor 126 may be placed above the high water level or mark 142 in the sump basin 104.

In operation, a rising water level in the sump basin 104 would exert a load on the sensor 126, from which a rise or fall rate of the water level in the sump basin 104 can be determined. If the sensor 126 does not detect any force exerted on it, there may be no water at the level of the sensor 126. Alternatively, the water level at the sensor 126 in the sump basin 104 may be constant. In other words, water rise rate, or inflow rate may equal the rate of water pumped out through the discharge pipe 112 by the sump pump 102. In an alternative scenario, the sensor 126 may sense an upward force of the rising water level when the sump pump 102 is operational, and an inlet sensor 130 (described later in more detail) detects water entering the sump basin 104 from the inlet 108, indicating that the inflow rate is greater than the rate of water pumped out through the discharge pipe 112 by the sump pump 102. In yet another scenario, the sensor 126 may sense rising water, the inlet sensor 130 may not detect any water inflow into the sump basin 104, and at the same time the sump pump 102 may be engaged, the scenario indicating that the water level is rising due to additional inflow (e.g., back flow from the discharge pipe, or the vent 120, or through the floor 106 opening of an uncovered sump basin).

The sump pump system 100 may include a vibration sensor 128, placed in direct or indirect contact with the sump pump 102 or pump motor 103. FIG. 1 shows the vibration sensor 128 located on the sump pump housing 105. In some embodiments, the vibration sensor 128 may be placed on the motor 103, the sump pump 102, the discharge pipe 112, or on any component within the sump basin 104. The vibration sensor 128 may be a ceramic piezoelectric sensor, or any suitable sensor capable of detecting vibration or acceleration of motion of a structure. In operation, by measuring the inertial vibration, the vibration sensor 128 monitors the condition, predicts or monitors wear, fatigue, and failure of the sump pump system 100 components, for example sump pump 102, the motor 103, the housing 105, or the discharge pipe 112 and their respective constituents by measuring their vibrational signatures and, thus, determining the kinetic energy and forces acting upon the components. The inertial vibration signatures, when compared to a standard or when monitored for changes over time, may predict wear, impending failures, and immediate failures, such as a loose bearing, a stuck motor 103, an overloaded motor 103, a dry motor 103, a damaged discharge pipe 112, a faulty check valve 114, a broken hermetic seal of the housing 105, a stuck impeller 117, debris on the impeller 117 or inside the sump pump 102, etc.

The inlet sensor 130 and the outlet sensor 132 of the sump pump system 100 may be water level sensors, analogous to the water level sensor 124. In operation, the sensor 130 detects presence of water in the inlet pipe 108, or inflow. If the sensor 130 does not detect water in the inlet pipe 108, there is no water flowing into the sump basin 104 via the inlet pipe 108. FIG. 1 shows the sensor 130 placed on the surface of the inlet pipe 108. In some embodiments, the sensor 130 may be embedded within the water inlet pipe 108, or placed at the junction of the inlet pipe 108 and the wall of the sump basin 104. In some embodiments, the sensor 130 may include a hinged flap or a hinged lid (not shown) covering the opening of the inlet pipe 108. When the pressure of the inflowing water lifts the flap, the displacement of the flap triggers a signal that water is flowing into the sump basin 104 via the inlet pipe 108. The flap displacement may be registered, for example, in the hinge mechanism (e.g., by breaking or establishing an electrical connection by the movement of the hinge parts), or as a disconnected electrical or a magnetic connection between the flap and the inlet pipe 108 or the wall of the sump basin 104. Alternatively, the sensor 130 may be a sensor configured to detect deflection of the flap (e.g., with a laser-based or an acoustic technology).

The outlet sensor 132 detects presence of water in the discharge pipe 112 before the check valve 114, monitoring whether the check valve 114 is working properly, i.e., preventing the back flow of water into the sump basin 104 when the motor 103 is disengaged and the sump pump 102 is not operating. FIG. 1 shows the sensor 132 placed inside the discharge pipe 112 before, or closer to the sump pump 102 than the check valve 114. In operation, if the sensor 132 does not detect water when the sump pump 102 is deactivated, then the check valve 114 may be assumed to be functioning properly.

The sensor 134 may be a water level sensor, placed at a level or mark 136 in the sump basin 104 corresponding to the bottom 137 of the impeller 117 and/or another sump pump component of the sump pump 102, which is below the low or initial water level or mark 140. In operation, if the sensor 134 does not detect water, then the current water level in the basin 104 may be deemed adequately low to avoid, prevent, reduce, etc. corrosion of the impeller 117 and/or another sump pump component due to standing water in the sump basin 104. On the other hand, if the water level sensor 134 detects water, then at least a portion of the impeller 117 and/or another sump pump component may be currently exposed to water and a condition for potential corrosion may exist. Alternatively, the sensor 134 may be a force sensor or transducer and configured to detect a water rise or fall rate, water movement (e.g., a disturbance, splashing, sloshing, ripples, etc.) in the sump basin 104 due to the sump pump 102 running, etc. at the level or mark 136.

The sensor 134 may include magnetic or mechanical floats, pressure sensors, optical, ultrasonic, radar, capacitance, electroconductive or electrostatic sensors. The sensor 134 may be a continuous or a point level switch. A continuous liquid level switch or sensor provides a continuous feedback showing liquid level within a specified range. A point level switch detects whether a liquid level is above or below a certain sensing point. In some embodiments, the sensor 134 may be a reed switch, or a mercury switch, a conductive level sensor, or any type of a suitable switch that changes a state from inactive to active as liquid level reaches a certain level relative to the switch position.

Each of the sensors 124, 126, 128, 130, 132, and 134 may include one or more associated circuits, as well as packaging elements. The sensors 124, 126, 128, 130, 132, and 134 may be electrically or communicatively connected with each other (e.g., via one or more busses or links, power lines, etc.), and may cooperate to enable "smart" functionality described within this disclosure.

The sump pump system 100 may include a mechanical shaker 101 that is physically attached to the sump pump 102 and/or the discharge pipe 112. When engaged, the shaker 101 vibrates at a given frequency for the purpose of transferring motion to the sump pump 102 or the discharge pipe 112 in order to cause the pump 102 or the discharge pipe 112 to vibrate in a manner sufficient to "break loose" a blockage that is blocking the impeller 117 or the pipe 112. The mechanical shaker 101 may be in the form of an electromechanical vibration device (e.g. a linear motor) that physically agitates or shakes the sump pump. The intensity and duration of the vibration produced by the mechanical shaker 101 may be set or adjusted as desired. For example, the mechanical shaker 101 may be set to vibrate intensely and continuously for a short burst of time. As another example, the mechanical shaker 101 may be set to vibrate in multiple operating cycles (e.g., 3 or 5 cycles), with each cycle producing a different level of vibration intensity (e.g., an increase in the level of intensity going from the first cycle to the last cycle). Further, different types of vibration profiles may be specified such as a sine sweep, random vibration, synthesized shock, etc. The mechanical shaker 101 may be a standalone unit that may be retrofitted or added to the sump pump 102. In some embodiments, the mechanical shaker 101 may be integrated with or be part of the sump pump 102. Further, both the mechanical shaker 101 and the water level sensor(s) in the system 100 may be connected to the controller 138 so that the controller 138 can control the operation of the mechanical shaker 101 and the water level sensor(s).

The mechanical shaker 101 may be automatically activated in response to detected soft mechanical failures, such as when water overflow is detected by water level sensor or when the motor 103 runs too long in the absence of any water overflow detection. The mechanical shaker 101 may also be automatically activated in response to the controller 138 detecting potential problems with the motor 103. For example, the controller 138 may detect a vibration or acceleration pattern (e.g., of the water or of the sump pump or sump pipe) indicative of a problem (e.g., a blockage), and may respond by activating the shaker 101.

In some examples, the sump pump controller 138 maintains, tests, etc. the sump pump system 100 by periodically (e.g., every 14 days) running the motor 103 for at least a short duration (e.g., 30 seconds), regardless of the amount of water in the sump basin 104.

To reduce, avoid, prevent, etc. corrosion of the impeller 117 due to extended exposure of the impeller 117 to standing, potentially dirty water, in some examples, the sump pump controller 138 periodically activates the motor 103 (e.g., every 14 days) until the level of water in the sump basin 104 as detected by, for example, the sensor 134 is below the bottom 137 of the impeller 117. When the sensor 134 is a level sensor, the level of water in the sump basin 104 may be detected as being below the impeller 117 when the sensor 134 fails to sense any water. When the sensor 134 is a force sensor, the level of water in the sump basin 104 may be detected as above the bottom 137 of the impeller 117 when the sensor 134 senses a falling water level, water movement (e.g., sloshing, splashing, ripples, etc.) due to pump vibrations, etc.

Additionally and/or alternatively, following a water event, the sump pump controller 138 runs the motor 103 until a current level of the water in the sump basin 104 as detected by, for example, the sensor 134 is below the bottom 137 of the impeller 117 and/or another sump pump component. Example water events include, but are not limited to, a storm, a flood, a plumbing failure, etc. that initially causes an initial inrush of incoming water, followed by a slower flow of incoming water. An example method of detecting a water event includes: (i) during a first time period, detecting that a rate at which water is rising in the sump basin exceeds a first threshold; (ii) during a second, later time period, detecting that a rate at which water is rising in the sump basin 104 is less than a second, lower threshold; and (iii) optionally detecting that water has stopped rising in the sump basin. In some examples, the force sensor 126 is configured to determine the water rise rate in the sump basin 104. The rate at which water is rising in the sump basin 104 may, additionally and/or alternatively, be determined by counting the number of activations of the motor 103 in a period of time to, for example, maintain a current level of water in the sump basin 104 below the water level or mark 142.

As shown in the illustrated example of FIG. 1, the sump pump controller 138 and/or, more generally, the sump pump system 100, may be a smart device that is part of the sump pump network system 160. However, the sump pump controller 138 and/or, more generally, the sump pump system 100 may, additionally and/or alternatively, operate as a standalone system.

The sump pump controller 138 may convey data, updates, alerts, etc. related to the sump pump system 100 to a smart home hub 152 at the property 150 via any number and/or type(s) of local network(s) 154. The smart home hub 152 may connect to smart home devices (e.g., the sump pump controller 138, the sump pump system 100, doorbells, lights, locks, security cameras, thermostats, etc.) to enable a user 156 (e.g., a homeowner) to install, configure, control, monitor, etc. such devices via an electronic device 158, such as a smartphone, a tablet, a personal computer, or any other computing device. In some embodiments, the smart home hub 152 may send alerts, updates, notifications, etc. when certain conditions occur (e.g., when the sump pump controller 138 detects potential failure conditions) to the user 156 via their electronic device 158. Additionally and/or alternatively, alerts, status updates, notifications, etc. may be provided remotely via any number and/or type(s) of remote network(s) 162, such as the Internet. Thus, the user 156 may receive alerts, status updates, notifications, etc. via their electronic device 158 both when they are at the property 150 and when they are away. Moreover, alerts, status updates, notifications, etc. may be sent to a remote processing server 164 (e.g., a server or servers associated with insurance provider or providers) via the remote network(s) 162 for remote monitoring, control, etc.

While examples disclosed herein are described with reference to the sump pump controller 138 receiving and processing data from the sensors 124, 126, 128, 130, 132 and 134 to maintain and/or detect failures of the sump pump system 100, additionally and/or alternatively, data from the sensors 124, 126, 128, 130, 132 and 134 may be sent to the remote processing server 164 for processing to control, maintain and/or detect failures of the sump pump system 100, etc. In some examples, the remote processing server 164 may be part of security system monitoring server.

In some examples, data from the sensors 124, 126, 128, 130, 132 and 134, and/or alerts, status updates, notifications, trends, etc. determined by the sump pump controller 138 are stored in a cache, datastore, memory, etc. 140 for subsequent recall.

While the example sump pump controller 138 and/or, more generally, the example sump pump system 100 for monitoring sump pumps for failures and/or maintaining sump pumps are illustrated in FIG. 1, one or more of the elements, processes, devices and/or systems illustrated in FIG. 1 may be combined, divided, re-arranged, omitted, eliminated or implemented in any other way. Further, the sump pump controller 138 and/or, more generally, the sump pump system 100 may include one or more elements, processes, devices and/or systems in addition to, or instead of, those illustrated in FIG. 1, and/or may include more than one of any or all of the illustrated elements, processes, devices and/or systems.

Figure 2:
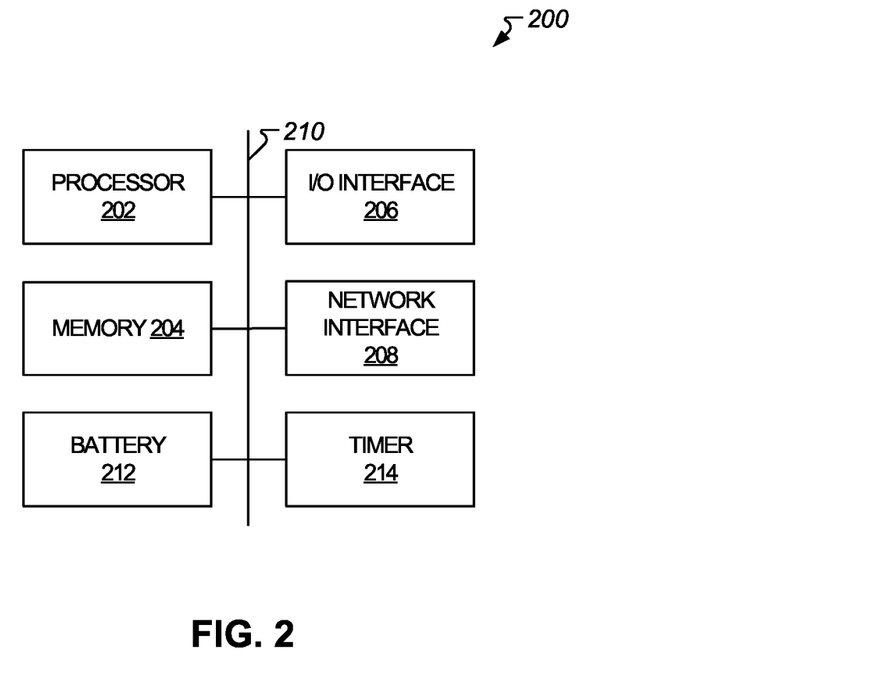
FIG. 2 is a block diagram of an example computing system to implement the various user interfaces, methods, functions, etc., for maintaining and detecting failures of sump pumps, in accordance with disclosed embodiments.

FIG. 2 is a block diagram of an example computing system 200 configured in accordance with described embodiments. The example computing system 200 may be used to, for example, implement all or part of the sump pump controller 138 and/or, more generally, the sump pump system 100. The computing system 200 may be, for example, a computer, an embedded controller, an Internet appliance, and/or any other type of computing device. Any one or more of the server 164, the hub 152, the device 158, or the controller 138 may be similar to the system 200, and may have components identical to or similar to those of the system 200.

The computing system 200 includes, among other things, a processor 202, memory 204, input/output (I/O) interface(s) 206 and network interface(s) 208, all of which are interconnected via an address/data bus 210. The program memory 204 may store software and/or machine-readable instructions that may be executed by the processor 202. It should be appreciated that although FIG. 2 depicts only one processor 202, the computing system 200 may include multiple processors 202. The processor 202 of the illustrated example is hardware, and may be a semiconductor based (e.g., silicon based) device. Example processors 202 include a programmable processor, a programmable controller, a graphics processing unit (GPU), a digital signal processor (DSP), an application specific integrated circuit (ASIC), a programmable logic device (PLD), a field programmable gate array (FPGA), a field programmable logic device (FPLD), etc. In this example, the processor implements sump pump controller 138.

The memory 204 may include volatile and/or non-volatile memory(-ies) or disk(s) storing software and/or machine-readable instructions. For example, the program memory 204 may store software and/or machine-readable instructions that may be executed by the processor 202 to implement the sump pump controller 138 and/or, more generally, the sump pump system 100. In some examples, the memory 204 is used to store the datastore 140.

Example memories 204 include any number or type(s) of volatile or non-volatile tangible, non-transitory, machine-readable storage medium or disks, such as semiconductor memory, magnetically readable memory, optically readable memory, a hard disk drive (HDD), an optical storage drive, a solid-state storage device, a solid-state drive (SSD), a read-only memory (ROM), a random-access memory (RAM), a compact disc (CD), a CD-ROM, a DVD, a Blu-ray disk, a redundant array of independent disks (RAID) system, a cache, a flash memory, or any other storage medium or storage disk in which information may be stored for any duration (e.g., permanently, for an extended time period, for a brief instance, for temporarily buffering, for caching of the information, etc.).

As used herein, the term non-transitory, machine-readable medium is expressly defined to include any type of machine-readable storage device and/or storage disk, to exclude propagating signals, and to exclude transmission media.

The processing platform 200 of FIG. 2 includes one or more communication interfaces such as, for example, one or more of the input/output (I/O) interface(s) 206 and/or the network interface(s) 208. The communication interface(s) enable the processing platform 200 of FIG. 2 to communicate with, for example, another device, system, host system, or any other machine such as the smart home hub 152 and/or the remote processing server 164.

The I/O interface(s) 206 of FIG. 2 enable receipt of user input and communication of output data to, for example, the user 156. The I/O interfaces 206 may include any number and/or type(s) of different types of I/O circuits or components that enable the processor 202 to communicate with peripheral I/O devices (e.g., the example sensors 124, 126, 128, 130, 132 and 134 of FIG. 1) or another system. Example I/O interfaces 206 include a universal serial bus (USB) interface, a Bluetooth® interface, a near field communication (NFC) interface, a serial interface, and/or an infrared transceiver. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (e.g., a mouse, a trackball, a capacitive touch pad, a joystick, etc.), a speaker, a microphone, a printer, a button, etc. Although FIG. 2 depicts the I/O interface(s) 206 as a single block, the I/O interface(s) 206 may include any number and/or type(s) of I/O circuits or components that enable the processor 202 to communicate with peripheral I/O devices and/or other systems.

The network interface(s) 208 enable communication with other systems (e.g., the smart home hub 152 of FIG. 1) via, for example, one or more networks (e.g., the networks 154 and 162). The example network interface(s) 208 include any suitable type of wired and/or wireless network interface(s) configured to operate in accordance with any suitable protocol(s) like, for example, a TCP/IP interface, a Wi-Fi™ transceiver (according to the IEEE 802.11 family of standards), an Ethernet transceiver, a cellular network radio, a satellite network radio, a coaxial cable modem, a digital subscriber line (DSL) modem, a dialup modem, or any other suitable communication protocols or standards. Although FIG. 2 depicts the network interface(s) 208 as a single block, the network interface(s) 208 may include any number and/or type(s) of network interfaces that enable the processor 202 to communicate with other systems and/or networks.

To provide, for example, backup power for the example sump pump controller 138 and/or, more generally, the example sump pump system 100, the example computing system 200 may include any number and/or type(s) of battery(-ies) 212.

To determine the time between events, the example computing system 200 includes any number and/or type(s) of timer(s) 214. For example, a timer 214 may be used to periodically trigger (e.g., every 14 days) the activation of the motor 103 for maintenance purposes. A timer 214 may, additionally and/or alternatively, be used to determine the rate at which water is rising in the sump basin (e.g., number of activations of the motor 103 required) during a period of time.

Figure 3:
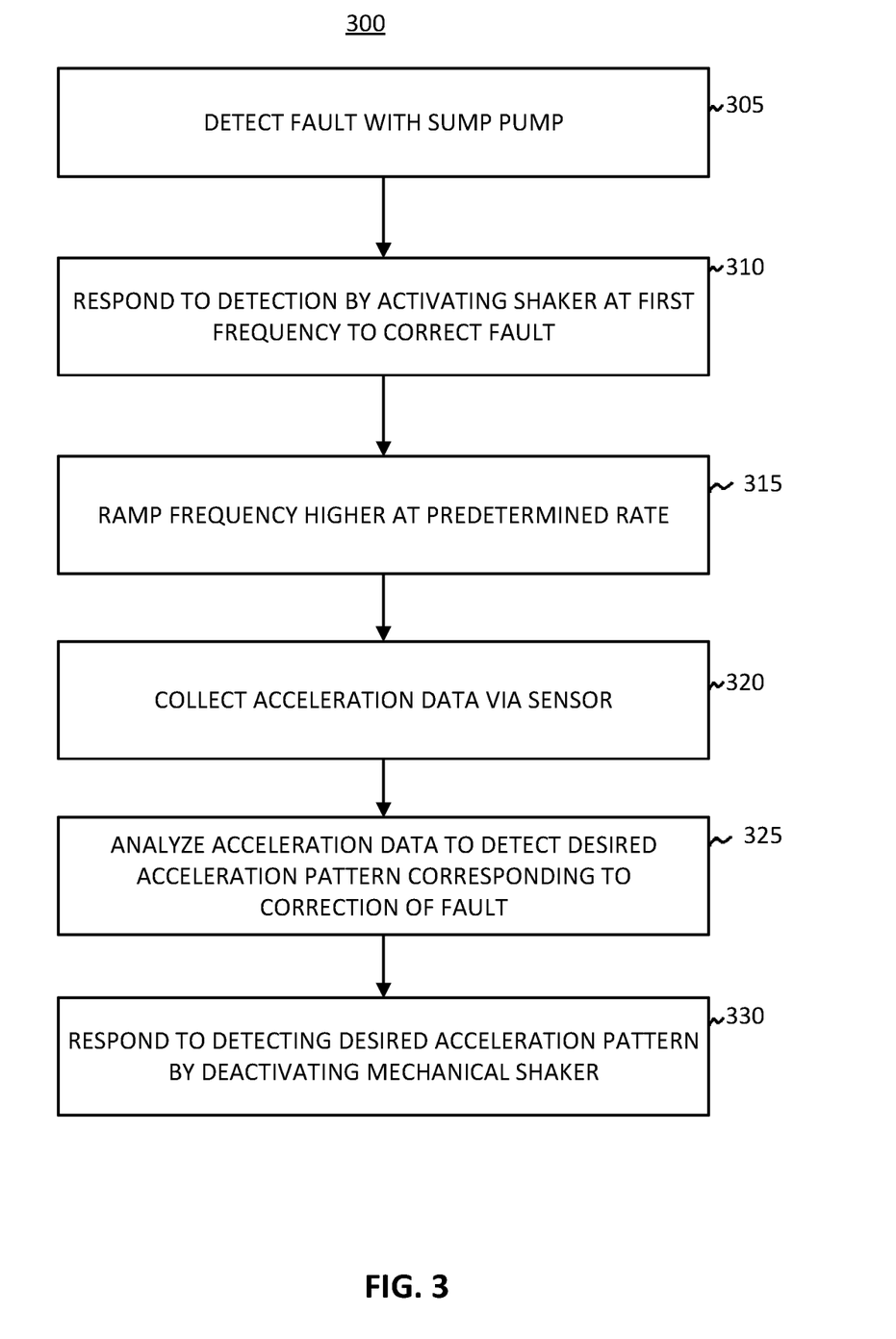
FIG. 3 depicts an example method for automatically determining and utilizing frequencies for mechanical shakers for sump pumps, in accordance with disclosed embodiments.

FIG. 3. depicts an example method 300 for automatically determining and utilizing frequencies for mechanical shakers for sump pumps. The method 300 may be implemented to detect a fault (e.g., a stuck impeller) with a sump pump and to identify a desirable frequency at which the mechanical shaker should vibrate to correct the fault.

The method 300 may be implemented, in whole or in part, by any suitable controller or system such as the sump pump controller 138 shown in FIG. 1 or the sump pump processor 202 shown in FIG. 2. In an embodiment, the method 300 may be embodied by a set of instructions or routines that are stored to memory and executable by a processor (e.g., of the controller 138) to implement the functionality of the method 300. If desired, the smart home hub 152 or the remote processing server 164 shown in FIG. 1, for example, may implement the method 300, depending on the embodiment. Understand that while the description below references structural or software components of a sump pump system shown in FIG. 1, the method 300 may be implemented with respect to any suitable sump pump and sump pump system to perform the described functions below.

At a step 305, a sump pump controller (e.g., controller 138) detects a fault with a sump pump (e.g., the sump pump 102), such as a stuck impeller. In some instances, the fault is a blockage of a discharge pipe. In an embodiment, the fault is a stuck float sensor that is used by the sump pump to detect high-water and low-water marks. This fault may be detected based on the fact that the pump is activated or engaged and no water is being discharged from the basin (e.g., which may be detected via a level sensor in the basin, a flow sensor in the discharge pipe(s), and/or a sensor configured to detect acceleration or motion that can be utilized as a proxy for level or flow.

At a step 310, the sump pump controller responds to detecting the fault by activating the shaker at a first (e.g., relatively low) frequency in an attempt to produce vibrations in the sump pump to correct the fault.

At a step 315, the sump pump controller ramps the frequency higher at a predetermined rate. This rate may be a factory default rate, or may be provided by a user (e.g., during setup).

At a step 320, the sump pump controller collects acceleration data via a sensor disposed on the sump pump, a sump pipe, or in the water in the sump basin.

At a step 325, the sump pump controller analyzes the acceleration data to detect a desired acceleration pattern corresponding to a correction of the fault. That is, the desired acceleration pattern may be "desired" in that it indicates the fault has been corrected. For example, if the fault is a stuck impeller and the shaker loosens debris from the impeller, water may begin flowing through the pump and outlet pipe again, which may be detectable via detected motion of the pump, pipe, or water.

At a step 330, the controller responds to detecting the desired acceleration pattern by deactivating the shaker.

Figure 4:
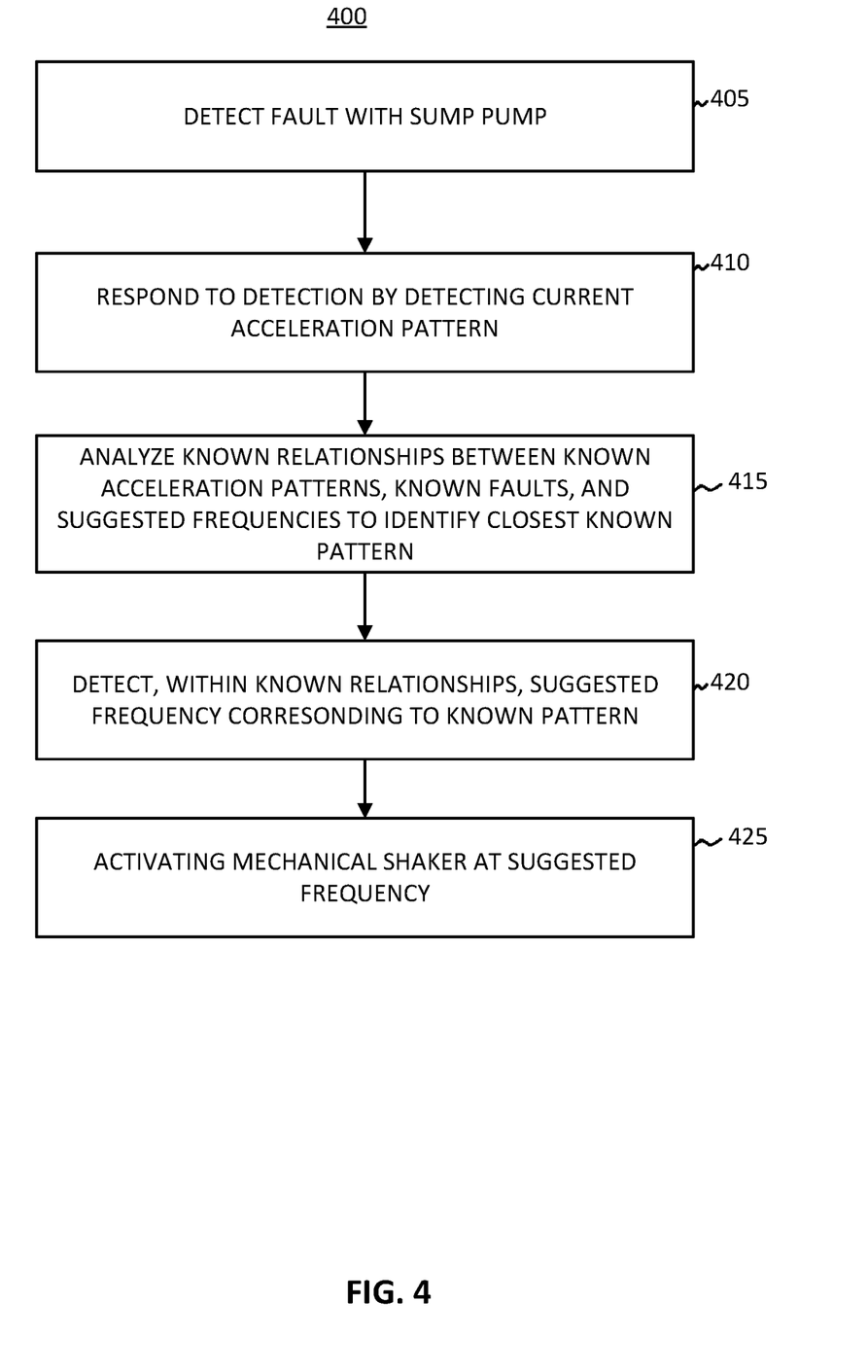
FIG. 4 depicts an example method for automatically determining and utilizing frequencies for mechanical shakers for sump pumps, in accordance with disclosed embodiments.

FIG. 4 depicts an example method 400 for automatically determining and utilizing frequencies for mechanical shakers for sump pumps. A sump pump system may implement the method 400 to detect a fault (e.g., a stuck impeller) with a sump pump and to identify a desirable frequency at which the mechanical shaker should vibrate to correct the fault. By contrast, most sump pump systems on the market vibrate at a set frequency.

The method 400 may be implemented, in whole or in part, by any suitable controller or system such as the sump pump controller 138 shown in FIG. 1. In an embodiment, the method 400 may be embodied by a set of instructions or routines that are stored to memory and executable by a processor (e.g., of the controller 138) to implement the functionality of the method 400. If desired, the smart home hub 152 or the remote processing server 164 shown in FIG. 2, for example, may implement the method 400, depending on the embodiment.

Understand that while the description below references structural or software components of the sump pump system shown in FIG. 1, the method 400 may be implemented with respect to any suitable sump pump and sump pump system to perform the described functions below.

At a step 405, a sump pump controller (e.g., the controller 138) detects a fault with a sump pump (e.g., the sump pump 102), such as a stuck impeller. In some instances, the fault is a blockage of a discharge pipe. In an embodiment, the fault is a stuck float sensor that is used by the sump pump to detect high-water and low-water marks. This fault may be detected based on the fact that the pump is activated or engaged and no water is being discharged from the basin (e.g., which may be detected via a level sensor in the basin, a flow sensor in the discharge pipe(s), and/or a sensor configured to detect acceleration or motion that can be utilized as a proxy for level or flow.

At a step 410, the sump pump controller responds to detecting the fault by detecting (e.g., via a sensor configured to detect acceleration) a current acceleration pattern in the water in the sump basin (e.g., the sump basin 104) or of the sump pump (e.g., the sump pump 102), or sump pipe (e.g., the discharge pipe 112).

At a step 415, the sump pump analyzes a set of known relationships (e.g., stored to a memory of the controller) between known acceleration patterns, known faults, and suggested frequencies to identify a known acceleration pattern most closely corresponding to the current acceleration pattern. For example, a stuck impeller may produce a different vibration pattern than a blocked discharge pipes. In some embodiments, the controller may further correlate the vibration patterns of the sump pump system components with harmonic resonant frequencies of the respective components. Knowing resonant frequencies of the sump pump system components may offer guidance for which frequencies to avoid in the system, to extend the operational life of the system. The controller may store to memory a first one or more examples patterns that correspond to a stuck impeller and a second one or more example patterns that correspond to a blocked pipe. The controller may then compare the current acceleration pattern to both the first one or more patterns and the second one or more patterns to see which of the sets of patterns it is more closely corresponded.

At a step 420, after identifying a known acceleration pattern from the set of known relationships, the controller may detect a suggested frequency linked to the known acceleration pattern. This may represent a frequency known to best address the detected fault. For example, a first frequency may be more effective for shaking loose debris from a stuck impeller, and a second frequency may be more effective for shaking loose blockage from a blocked pipe.

At a step 425, the controller activates the shaker at the suggested frequency. The controller may detect that suggested frequency corrected the fault (e.g., based on a detected acceleration pattern) and may respond by deactivating the pump. If desired, the controller may detect that the fault was not corrected, and may respond by generating an alarm (e.g., at a user's mobile device). The controller may respond to detecting that the fault was not corrected by identifying the next closest acceleration pattern, and may utilize the suggested frequency linked to the next closest acceleration pattern to shake the mechanical shaker. In some embodiments, the controller may respond to detecting that the fault was not corrected by simply ramping the frequency up or down. The decision to ramp up or down may be based on whether the next closest frequency is higher or lower than the current frequency. In an embodiment, the decision to ramp up or down may be based on whether the current frequency is closer to one end range or the other. For example, if the current frequency of the shaker is near the low-end of the potential frequencies for the mechanical shaker, the controller may ramp up the frequency. In some embodiments, the controller may determine which frequencies for shaker activations to avoid in order to avoid the harmonic resonance frequencies of other sump pump system components. In some embodiments with a variable speed pump motor, the controller may determine which motor speeds to avoid in order to avoid the harmonic resonance frequencies of other sump pump system components, and adjust the motor speed accordingly.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the method 300 specifically, the described functions may be implemented, in whole or in part, by the devices, circuits, or routines of the system 100 shown in FIG. 1. The method 300 may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

What is claimed is:

1. A sump pump system configured to automatically determine and utilize frequencies for mechanical shakers, the sump pump system comprising:
   a sump pump disposed in a sump basin and configured to pump water out of the sump basin via an outlet pipe;
   a sensor configured to detect acceleration;
   a mechanical shaker attached to the sump pump and configured to shake the sump pump in order to produce vibrations in the sump pump;
   a sump pump control system coupled to the sump pump, the sensor, and the mechanical shaker, wherein the sump pump control system is configured to:
   detect a fault with the sump pump;
   respond to detecting the fault by activating the mechanical shaker at a first frequency to shake the sump pump in order to produce vibrations in the sump pump in an attempt to correct the fault;
   ramp the frequency up at a predetermined rate;
   while the sump pump control system is ramping the frequency: (i) collect acceleration data representing acceleration detected via the sensor, and (ii) detect, based on an analysis of the collected acceleration data, a desired acceleration pattern corresponding to a correction of the fault; and
   respond to detecting the desired acceleration pattern by deactivating the mechanical shaker.

2. The sump pump system of claim 1, wherein the sensor is configured to be disposed on the sump pump to detect acceleration when the sump pump vibrates or on the outlet pipe to detect acceleration when the outlet pipe vibrates, and wherein the desired acceleration pattern indicates the sump pump or outlet pipe is vibrating in a manner consistent with water flowing through the sump pump and out of the outlet pipe.

3. The sump pump system of claim 1, wherein the sensor is configured to be disposed on or within water in the sump basin to detect acceleration in response to movement of the water; and wherein the desired acceleration pattern indicates a level of water in the sump basin is dropping.

4. The sump pump system of claim 1, wherein the fault is a stuck impeller.

5. The sump pump system of claim 1, wherein the fault is a blockage of the outlet pipe.

6. The sump pump system of claim 1, wherein the fault is a stuck level sensor that the sump pump utilizes to detect a high-water mark at which it activates.

7. A method for automatically determining and utilizing frequencies for mechanical shakers, the method comprising:
   detecting, via a sump pump control system, a fault with a sump pump;
   responding, via the sump pump control system, to detecting the fault by activating the mechanical shaker at a first frequency to shake the sump pump in order to produce vibrations in the sump pump in an attempt to correct the fault;
   ramping the frequency higher at a predetermined rate;
   while the sump pump control system is ramping the frequency: (i) collecting acceleration data representing acceleration detected via a sensor, and (ii) detecting, based on an analysis of the collected acceleration data, a desired acceleration pattern corresponding to a correction of the fault; and
   responding, via the sump pump control system, to detecting the desired acceleration pattern by deactivating the mechanical shaker.

8. The method of claim 7, wherein the sensor is configured to be disposed on the sump pump to detect acceleration when the sump pump vibrates or on the outlet pipe to detect acceleration when the outlet pipe vibrates, and wherein the desired acceleration pattern indicates the sump pump or outlet pipe is vibrating in a manner consistent with water flowing through the sump pump and out of the outlet pipe.

9. The method of claim 7, wherein the sensor is configured to be disposed on or within water in the sump basin to detect acceleration in response to movement of the water; and wherein the desired acceleration pattern indicates a level of water in the sump basin is dropping.

10. The method of claim 7, wherein the fault is a stuck impeller.

11. The method of claim 7, wherein the fault is a blockage of the outlet pipe.

12. The method of claim 7, wherein the fault is a stuck level sensor that the sump pump utilizes to detect a high-water mark at which it activates.

13. A method for automatically determining and utilizing frequencies for mechanical shakers, the method comprising:
   detecting, via a sump pump control system, a fault with a sump pump;
   responding, via the sump pump control system, to detecting the fault by:
   (i) detecting, via a sensor configured to detect acceleration, a current acceleration pattern;
   (ii) analyzing a set of known relationships between known acceleration patterns, known faults, and suggested frequencies to identify a known acceleration pattern most closely corresponding to the current acceleration pattern;

(iii) detecting, within the set of known relationships, a suggested frequency corresponding to the known acceleration pattern; and (iv) activating a mechanical shaker that is physically attached to the sump pump and that is configured to shake according to a frequency variable, to shake at the suggested frequency, to thereby shake the sump pump in order to produce vibrations in the sump pump in an attempt to correct the fault.

14. The method of claim 13, further comprising detecting that activating the mechanical shaker at the suggest frequency corrected the fault.

15. The method of claim 13, further comprising detecting that activating the mechanical shaker at the suggested frequency did not correct the fault.

16. The method of claim 15, further comprising generating an alarm in response to detecting that the fault was not corrected.

17. The method of claim 15, further comprising responding to detecting that the fault was not corrected by: (i) analyzing the set of known relationships to identify a second known acceleration pattern that is the next most closely corresponding to the current acceleration pattern; (ii) detecting, within the set of known relationships, a second suggested frequency corresponding to the second known acceleration pattern; and (iii) causing the mechanical shaker to shake at the second suggested frequency.

18. The method of claim 15, further comprising responding to detecting that the fault was not corrected by ramping up or down the frequency for the mechanical shaker.

19. The method of claim 18, further comprising:
(i) analyzing the set of known relationships to identify a second known acceleration pattern that is the next most closely corresponding to the current acceleration pattern;
(ii) detecting, within the set of known relationships, a second suggested frequency corresponding to the second known acceleration pattern;
(iii) ramping the frequency up when the second suggested frequency is higher than the current suggested frequency; and
(iv) ramping the frequency down when the second suggested frequency is lower than the current suggested frequency.

20. The method of claim 18, further comprising:
while the sump pump control system is ramping the frequency up or down: (i) collecting acceleration data representing acceleration detected via the sensor, and (ii) detect, based on an analysis of the collected acceleration data, a desired acceleration pattern corresponding to a correction of the fault; and
responding to detecting the desired acceleration pattern by deactivating the mechanical shaker.

* * * * *